Feb. 6, 1934.   J. L. CAMPBELL   1,945,770
BALANCE INDICATOR FOR WEIGHING SCALES
Filed Nov. 10, 1931   3 Sheets-Sheet 1
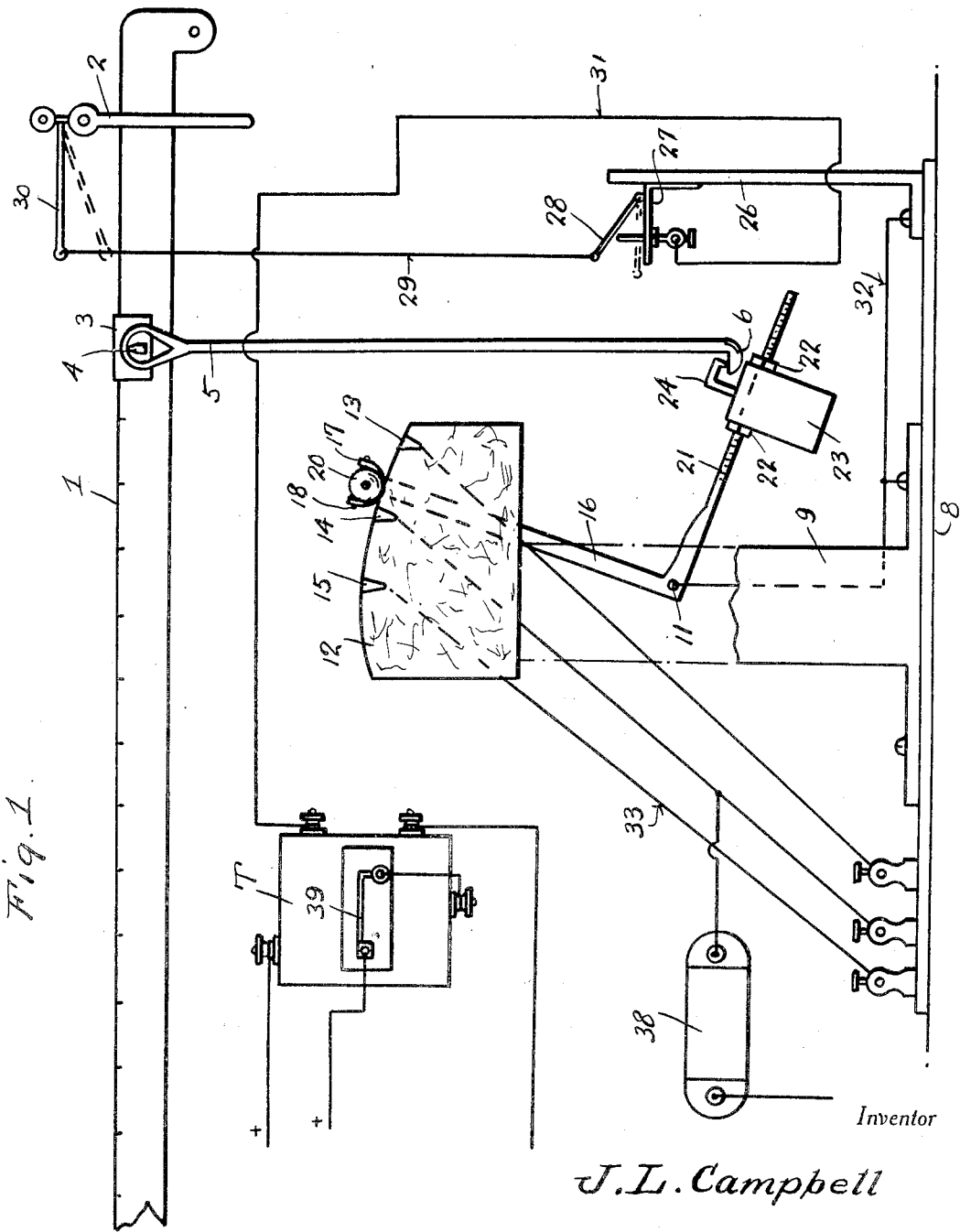
Inventor
J. L. Campbell
By Clarence A. O'Brien
Attorney Feb. 6, 1934. J. L. CAMPBELL 1,945,770
BALANCE INDICATOR FOR WEIGHING SCALES
Filed Nov. 10, 1931 3 Sheets-Sheet 2
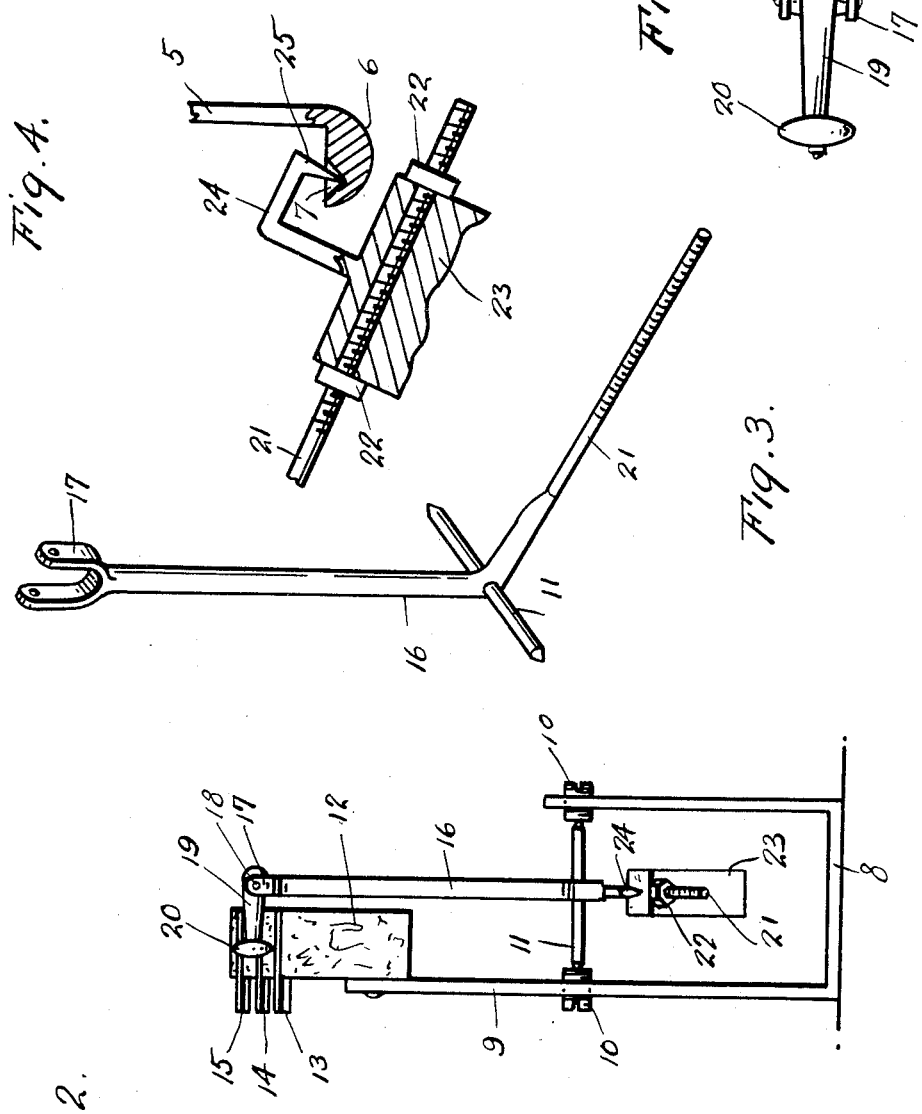
Inventor
J. L. Campbell
By Clarence A. O'Brien
Attorney

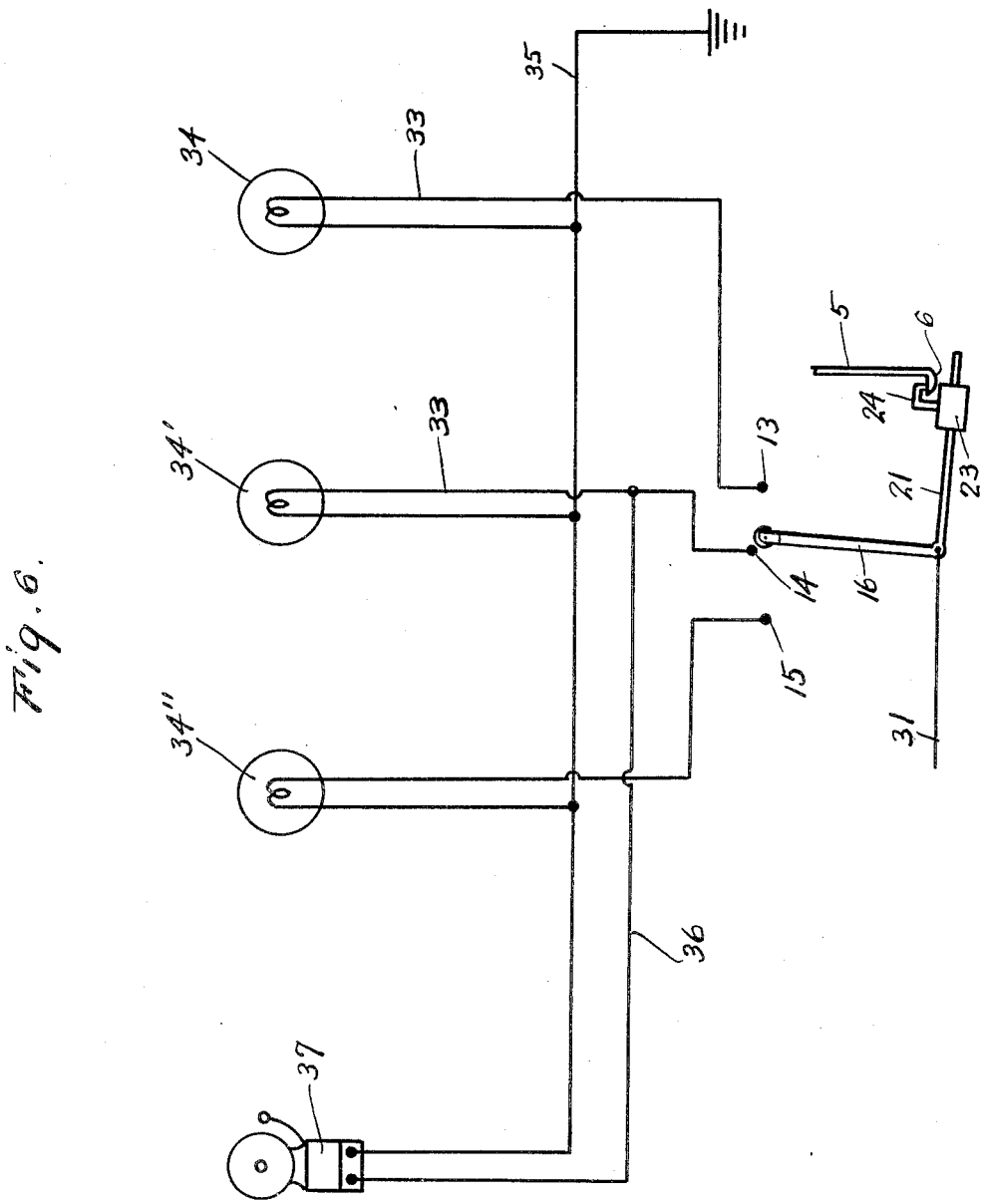

Patented Feb. 6, 1934

1,945,770

UNITED STATES PATENT OFFICE 1,945,770

BALANCE INDICATOR FOR WEIGHING SCALES

James L. Campbell, Lansing, Mich.

Application November 10, 1931
Serial No. 574,186

4 Claims. (Cl. 200—8)

This invention relates to electrically operated and controlled balance indication means for weighing scales and other devices, the general object of the invention being to provide means whereby the true balance, underbalance and overbalance of weighing scales are indicated either at the place of installation or at a remote point whereby one can tell by glancing at the indicator whether the material being weighed is insufficient in amount or too much or is correct in quantity.

This invention also consists in certain other features of construction and in the combination and arrangement of the several parts to be hereinafter fully described, illustrated in the accompanying drawings and specifically pointed out in the appended claims.

In describing the invention in detail reference will be had to the accompanying drawings wherein like characters denote like or corresponding parts throughout the several views, and in which:

Figure 1 is a view largely diagrammatic showing the invention associated with a scale beam.

Figure 2 is an edge view of the roller carrying bell crank lever and its supporting means and the block carrying the contacts engaged by the roller.

Figure 3 is a perspective view of the bell crank.

Figure 4 is a sectional detail view showing how the hook on the weight on the bell crank engages the lower part of the rod supported by the scale beam.

Figure 5 is a view of the roller carrying arm of the bell crank.

Figure 6 is a diagrammatic view of the circuit for the indicator means.

In these drawings, the numeral 1 indicates a part of a scale beam and the numeral 2 indicates a control or lock for the beam. The numeral 3 indicates a member connected with the beam for carrying a wedge 4 over which is placed the looped upper end of a rod 5, the lower end of which is formed with a right angle enlargement 6 having a V-shaped recess 7 therein.

The numeral 8 indicates a base to which an upright 9 is connected, said upright being preferably formed of a U-shaped member having one limb longer than the other with the limbs carrying the adjustable bearings 10 for the shaft 11 which has its ends pointed to engage recesses in the members 10. A block 12 of non-conducting material is supported on the upper end of the long limb of the upright or member 9 and carries a number of contacts in its curved upper edge, the drawings showing three of these contacts which are numbered 13, 14 and 15. A bell crank 16 is connected with the shaft and the upper end of the bell crank is forked as shown at 17 and this forked part supports the bearings 18 of an arm 19 which carries a roller 20 which engages said curved upper edge of the block and of course will engage the contacts 13, 14 and 15 as it moves over said upper edge of the block. The lower part of the bell crank is of circular shape in cross section and threaded as shown at 21 to receive a pair of nuts 22 which act to hold a weight 23 in adjusted position on said lower arm of the bell crank. The weight is formed with a hook 24 which has a wedge-shaped depending part 25 for engaging the recess 7.

An upright 26 is carried by the base 8 and supports a switch 27, the movable part of which is shown at 28 and this part is connected by a flexible member 29 or the like with an arm 30 on the control 2 so that when the control 2 is moved to releasing position the arm 30 moves downwardly thus permitting the member 29 to move the part 28 to closing position so as to permit current to flow from the supply line 31 to the conductor 32 which is electrically connected to the bell crank so that current will flow through the roller 20 and when the roller is in engagement with one of the contacts on the block 12 current will pass from the contact through a conductor 33, one of which is connected to each of the contacts 13, 14 and 15, and to the signal means.

The conductors 33 lead to lamps 34, 34' and 34" and the lamps are connected to the return or ground line 35. The central conductor 33 or that one which is connected to the contact 14 and lamp 34' is connected by a conductor 36 to an alarm 37.

From the foregoing it will be seen that upon movement of the scale beam, after the closing of the main switch 27 and 28 by the releasing movement of the control 2, the rod 5 will impart movement to the bell crank by means of the parts 6 and 24 and the weight 23 and on the first part of the movement of the bell crank the roller 20 will engage the contact 13 thus closing the circuit to lamp 34 which is electrically connected with the contact 13 and if the parts remain in this position one will know that there is not enough material being weighed and that more material must be placed on the scales.

When the roller comes into engagement with the contact 14 both the lamp 34' and the alarm 37 will have their circuits closed thus indicating the true balance but if there is too much material being weighed the roller will engage the third contact 15 and close the circuit to the lamp 34" which will indicate over weight.

As will be seen when the true weight is reached both the alarm and the lamp 34' will be in a closed circuit.

It will of course be understood that the weight 23 acts to hold the bell crank in a lowered position and that the nuts 22 permit adjustment of the weight in accordance with the operating motion of the scales.

To prevent arcing or burning of the contact point which is connected to both the audible and visible signal I connect a condenser 38 of any desired type to the conductor leading from the contact 14 to the lamp 34' and the alarm 37. This condenser is also connected to the ground wire 35.

I prefer to place a transformer T in the supply line 31 and to provide a thermostat device shown generally at 39 in the transformer to prevent overheating and consequent harm to the mechanism as well as to the transformer itself. This thermostat device may be of any desired type and acts as a circuit breaker.

It will of course be understood that the audible alarm 37 may be connected electrically with any one of the contacts 13, 14, 15 as desired, but the audible and visual signals form a unit and are wired as such. The signal means can be arranged at a remote point or adjacent the scale or one set of signal means can be arranged adjacent the scale and another set at a remote point.

It is thought from the foregoing description that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:

1. In combination, a supporting member of non-conducting material having an arcuate upper face, spaced contacts in said face, a bell crank, a contact member connected with the upper end of said bell crank and engaging the said face, means for pivotally supporting the bell crank below the supporting member, a weight adjustably connected to the lower arm of the bell crank, a projection on the weight, and an actuating member having a part thereon engaging the projection for oscillating the bell crank.

2. In combination, a supporting member of non-conducting material having an arcuate upper face, spaced contacts in said face, a bell crank, a contact member connected with the upper end of said bell crank and engaging the said face, means for pivotally supporting the bell crank below the supporting member, a weight adjustably connected to the lower arm of the bell crank, a projection on the weight, an actuating member having a part thereon engaging the projection for oscillating the bell crank, said projection being connected with the upper part of the weight and having a depending portion and the actuating member having a lateral projection formed with a recess for receiving the depending portion of the projection.

3. In combination, a supporting member of non-conducting material having its upper face curving upwardly from one end of the supporting member to the other, spaced contacts in said face, a bell crank pivotally supported below the supporting member and having one of its arms extending upwardly beyond the curved face of the supporting member, a roller contact carrying arm pivotally connected to the upper end of the said arm of the bell crank lever with its roller contact engaging the curved face of the supporting member, the lower arm of the bell crank having a weight adjustably connected thereto which tends to hold the bell crank with the roller at the lower end of the curve of said face, a projection on the weight and an actuating member having a part engaging the projection.

4. In indicating means for a weighing scale provided with a beam, a supporting member of non-conducting material having its upper face curving upwardly from one end of the member and said face having a number of spaced contacts therein, a bell crank pivotally supported below the supporting member and having one of its arms extending upwardly, a roller contact carried by the upper end of said arm for engaging the curved face of the supporting member, the other arm of the lever extending downwardly, a weight adjustably supported on said last-mentioned arm, a projection on the weight, a bar depending from the beam and having a part thereon engaging the projection.

JAMES L. CAMPBELL.